(12) United States Patent
Le Quere

(10) Patent No.: US 11,754,214 B2
(45) Date of Patent: Sep. 12, 2023

(54) CONNECTING DEVICE WITH AN INTERMEDIATE UNLOCKING POSITION

(71) Applicant: PARKER HANNIFIN EMEA SARL, Etoy (CH)

(72) Inventor: Philippe Le Quere, Betton (FR)

(73) Assignee: PARKER HANNIFIN EMEA SARL, Etoy (CH)

( * ) Notice: Subject to any disclaimer, the term of this patent is extended or adjusted under 35 U.S.C. 154(b) by 142 days.

(21) Appl. No.: 17/599,836

(22) PCT Filed: Mar. 27, 2020

(86) PCT No.: PCT/EP2020/058757
§ 371 (c)(1),
(2) Date: Sep. 29, 2021

(87) PCT Pub. No.: WO2020/201109
PCT Pub. Date: Oct. 8, 2020

(65) Prior Publication Data
US 2022/0163155 A1    May 26, 2022

(30) Foreign Application Priority Data
Apr. 2, 2019   (FR) ..................................... 19 03531

(51) Int. Cl.
*F16L 37/42*       (2006.01)
*F16L 37/084*     (2006.01)

(52) U.S. Cl.
CPC ........... *F16L 37/42* (2013.01); *F16L 37/0841* (2013.01)

(58) Field of Classification Search
CPC ....... F16L 37/42; F16L 37/0841; F16L 37/22; F16L 37/086
See application file for complete search history.

(56) References Cited

U.S. PATENT DOCUMENTS

| 4,311,328 A * | 1/1982 | Truchet ................... F16L 37/22 |
| 2003/0146623 A1* | 8/2003 | Lacroix ............... F16L 37/0841 |

(Continued)

FOREIGN PATENT DOCUMENTS

| EP | 1422461 | 5/2004 |
| EP | 1422462 | 10/2006 |

(Continued)

OTHER PUBLICATIONS

International Search Report and Written Opinion for corresponding International Patent Application No. PCT/EP2020/058757 dated Jun. 22, 2020.

*Primary Examiner* — Zachary T Dragicevich
(74) *Attorney, Agent, or Firm* — Renner, Otto, Boisselle & Sklar, LLP

(57) ABSTRACT

A coupling device includes a tubular body defining a channel having along an axis a first segment for receiving an endpiece and a second segment including an axially movable valve member which is spring-thrustable from the endpiece from a closed position, towards a disengaged position. The first segment includes a latch movably mounted to the housing and transversely movable via spring relative to the channel-between unlocked and locked positions. The latch includes a transverse bore enabling the endpiece to pass through the latch to push against the valve member, and first and second steps projecting into the bore in axially offset positions such that, when the latch is locked, the first step retains the endpiece in a pushed-in position holding the valve member disengaged and when the latch is unlocked, the second step retains the endpiece in an intermediate position leaving the valve member closed to enable endpiece purging.

8 Claims, 5 Drawing Sheets

(56) References Cited

U.S. PATENT DOCUMENTS

| | | | | |
|---|---|---|---|---|
| 2005/0197000 | A1* | 9/2005 | Tiberghien | F16L 37/42 |
| 2008/0265574 | A1* | 10/2008 | Tiberghien | F16L 37/42 |
| 2009/0194722 | A1* | 8/2009 | Tiberghien | F16L 37/0841 |
| 2016/0169430 | A1* | 6/2016 | Tiberghien | F16L 37/42 |

FOREIGN PATENT DOCUMENTS

| | | |
|---|---|---|
| EP | 1853842 | 7/2009 |
| FR | 1503989 | 12/1967 |
| FR | 2640721 | 6/1990 |

\* cited by examiner

CONNECTING DEVICE WITH AN INTERMEDIATE UNLOCKING POSITION

This application is a national phase of International Application No. PCT/EP2020/058757 filed Mar. 27, 2020, which claims the benefit of French Application No. 19 03531 filed Apr. 2, 2019, the contents of which are incorporated herein by reference.

The present invention relates to the field of transporting fluid, and in particular industrial or automotive circuits for transporting fluid.

TECHNOLOGICAL BACKGROUND

One of the main difficulties with fluid transport circuits is to be able to disconnect circuit elements while the circuit is under pressure. A coupling device that is known, in particular from Document FR-A-2 640 721, comprises a tubular body defining a channel having successively along an axis a first segment for receiving an endpiece and a second segment in which a valve member is mounted to be axially movable under thrust from the endpiece from a closed position closing a seat that extends between the first segment and the second segment, towards a disengaged position disengaging the seat. The first segment is provided with a housing in which a latch is movably mounted to move transversely relative to the channel between an unlocking position and a locking position into which the latch is urged by a spring. The latch is provided with a transverse bore enabling the endpiece to pass through the latch to push against the valve member, a first step and a second step projecting into the bore in axially offset positions in such a manner that, when the latch is in the locking position, the first step retains the endpiece in a pushed-in position holding the valve member in its disengaged position, and when the latch is in the unlocking position, the second step retains the endpiece in an intermediate position leaving the valve member in its closed position, thereby enabling the endpiece to be purged.

When the endpiece is connected to the body, it is retained in the channel by the first step of the latch in the locking position and it pushes back the valve member into the disengagement position. The fluid can flow under pressure between the body and the endpiece. In order to disconnect the endpiece from the body, it suffices to bring the latch into the unlocking position: Under pressure from the fluid and the return spring of the valve member when in the closed position, the endpiece moves back until it comes into abutment against the second step, which retains the endpiece in an intermediate position. The valve member is then in the closed position, and the endpiece is separated from the valve member, allowing fluid that is present in the portion of the circuit that is coupled to the endpiece to escape. Such at least partial purging of this portion of the circuit causes the pressure to drop therein. Nevertheless, such a device is not very practical, since it is necessary to keep the latch in the unlocking position long enough for the pressure in this portion of the circuit to come into equilibrium with ambient pressure, since otherwise the endpiece could be ejected violently from the coupling device.

OBJECT OF THE INVENTION

An object of the invention is to provide a coupling device that is more practical than prior art coupling devices, while retaining a structure that is simple.

BRIEF SUMMARY OF THE INVENTION

To this end, according invention, there is provided a coupling device comprising a tubular body defining a channel having successively along an axis a first segment for receiving an endpiece and a second segment in which a valve member is mounted to be axially movable under thrust from the endpiece from a closed position closing a seat that extends between the first segment and the second segment, towards a disengaged position disengaging the seat, the first segment being provided with a housing in which a latch is movably mounted to move transversely relative to the channel between an unlocking position and a locking position into which the latch is urged by a spring, the latch being provided with a transverse bore enabling the endpiece to pass through the latch to push against the valve member, a first step and a second step projecting into the bore in axially offset positions in such a manner that, when the latch is in the locking position, the first step retains the endpiece in a pushed-in position holding the valve member in its disengaged position, and when the latch is in the unlocking position, the second step retains the endpiece in an intermediate position leaving the valve member in its closed position, thereby enabling the endpiece to be purged.

The latch is movable along the axial direction of the channel between a first axial position in which the latch and a wall of the housing have a first pair of retaining portions in mutual contact to retain the latch in the unlocking position, and a second axial position in which said retaining portions are disengaged from each other, the second axial position being closer to the valve member than the first axial position.

Thus, during disconnection, the endpiece moves back under drive from the pressure, and as a result of the valve member moving into abutment against the second step, it entrains the latch away from its unlocking position towards the first axial position. In this axial position, the retaining portions cooperate mutually to hold the latch in its unlocking position without any need for the operator to hold it.

Other characteristics and advantages of the invention appear on reading the following description of a particular and nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
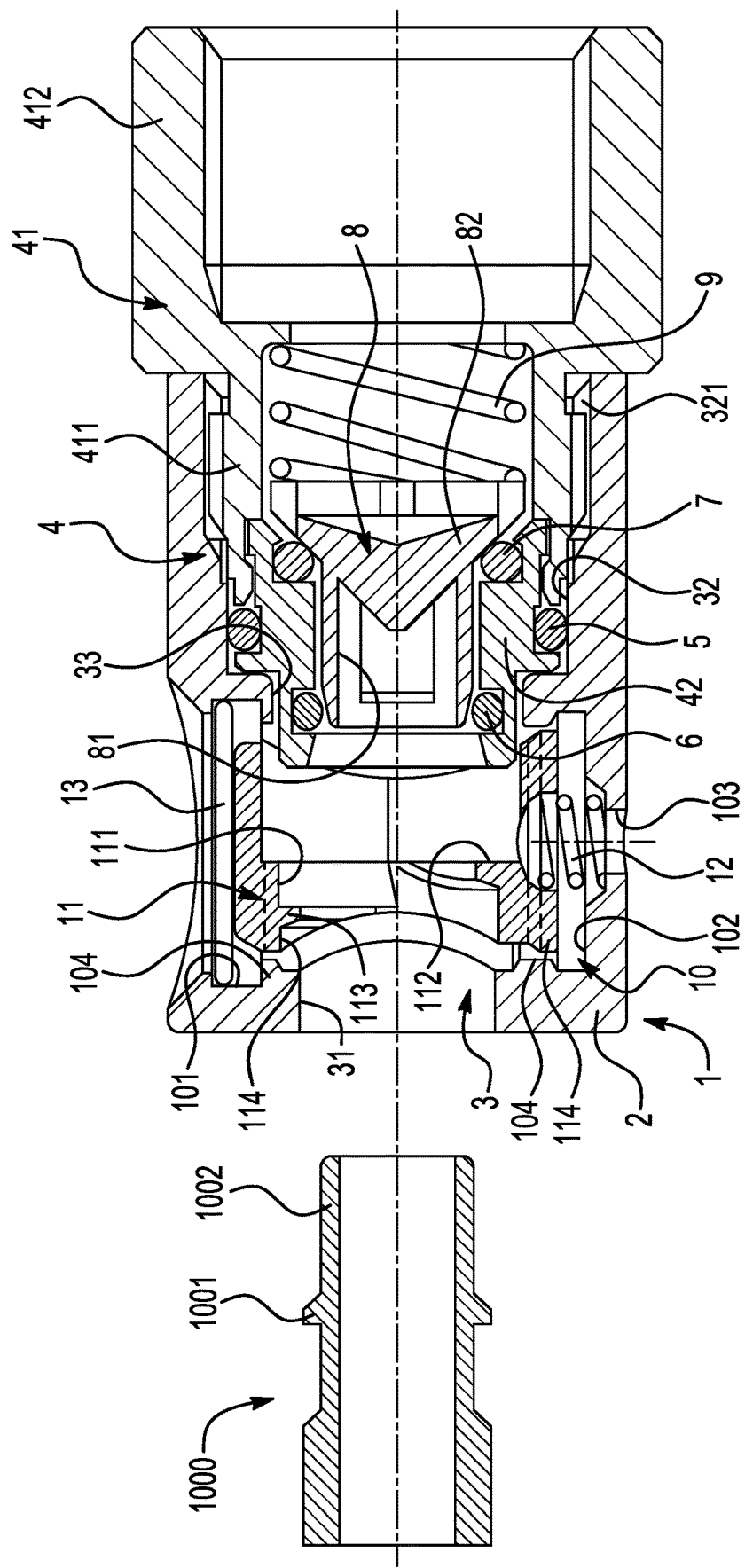
FIG. 1 is an axial section view of a coupling device of the invention, prior to coupling an endpiece.

With reference to the figures, the coupling device of the invention, given overall reference 1, is adapted to link together a first element and a second element of a fluid transport circuit. By way of example, the circuit elements, which are not visible in the figures, may be pipes, a pipe and a pump, a pipe and a tank, a pipe and a manifold, a pipe and an actuator, . . . . The first element is linked to a first end portion of a tubular endpiece, given overall reference 1000, that also has an opposite, second end portion that is provided externally with a flange 1001 and that has a nose 1002 extending beyond the flange 1001. The first end portion of the endpiece 1000 is linked to the circuit element in conventional manner, e.g. by means of a force fit, adhesive, welding, soldering, a clamping collar, . . . , depending on the material of the circuit element and on the material of the endpiece. The second element is linked to the coupling device 1 in a manner that is explained below.

The coupling device 1 comprises a tubular body 2 defining a channel 3 having successively along an axis: a first segment 31 and a second segment 32 that are on the same axis and that are spaced apart from each other by an intermediate segment 33.

Figure 2:
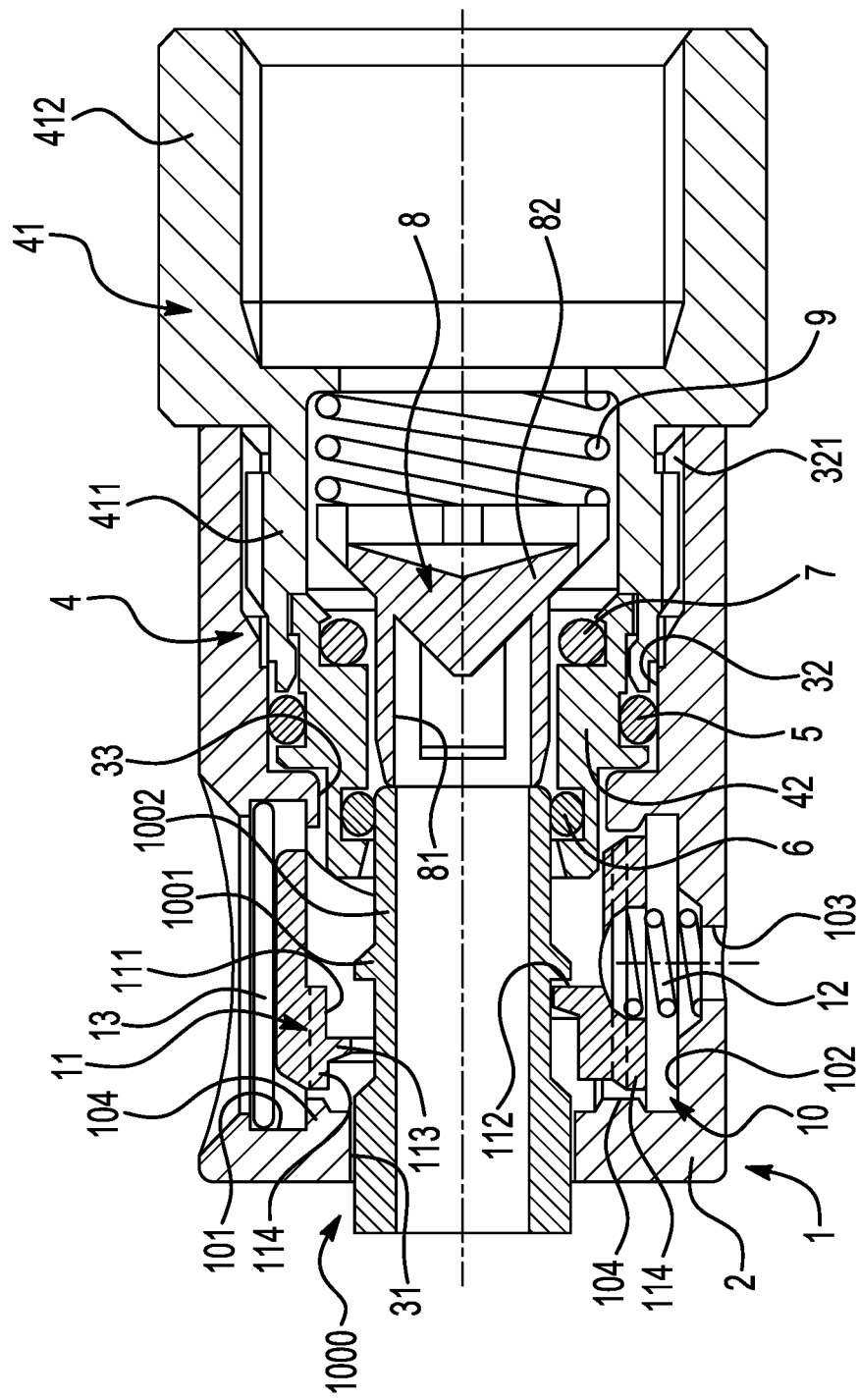
FIG. 2 is a view analogous to FIG. 1, after the endpiece has been coupled, the endpiece being in its connected position in the coupling device and the latch being in a locking transverse position and in a second axial position.

The second segment 32 receives a portion of a connection assembly, given overall reference 4, for connecting to the second circuit element. The connection assembly 4 comprises a bushing 41 extended by a tubular insert 42. The bushing 41 has a threaded first end portion 411 engaged in end tapping 321 of the second segment 32, and a tapped second end portion 412 into which a threaded portion of the second circuit element is to be screw fastened. The tubular insert 42 projects from the first end portion 411 as far as the intermediate segment 33 of the channel 3, and it is fastened to the first end portion 411 by adhesive, welding, snap fastening, etc. The tubular insert 42 is fitted: with an outer sealing gasket 5 sized to provide sealing between the inner wall of the second segment 32 and the outer surface of the tubular insert 42; with a first inner sealing gasket 6 sized to provide sealing between the outer surface of the nose 1002 and the inner surface of the tubular insert 42; and with a second inner sealing gasket 7 sized to provide sealing between the outer surface of a valve member 8 and the inner surface of the tubular insert 42. The valve member 8 is mounted in the tubular insert 42 to be movable axially under thrust from the endpiece from a closed position closing a seat defined by the second inner sealing gasket 7 (the position shown in FIG. 1) to a disengaged position away from the seat, in which the valve member 8 is no longer in contact with the second inner sealing gasket 7 (FIG. 2). The valve member 8 has a guide body 81 with perforations to allow the fluid to pass through, the guide body extending inside the tubular insert 42 and passing through the second inner sealing gasket 7, and a head 82 extending beside the second inner sealing gasket 7 over its side remote from the first inner sealing gasket 6. The head 82 is coupled to the guide body 81 by a convex frustoconical surface that is to bear against the second inner sealing gasket 7, and it possesses a flat surface against which there bears a helical spring 9 extending axially in the first end portion 411 of the bushing 41 so as to bear against an inner shoulder of the bushing 41 and push the valve member 8 towards its closed position.

The first segment 31 is arranged to receive the second end portion of the endpiece 1000 and it is provided with a housing 10 that extends transversely relative to the first segment 31 with a first end 101 opening to the outside of the body 2 and with a second end that is closed by an end wall 102 that is pierced by a purge orifice 103 opening to the outside of the body 2. On either side of the first segment 31, the housing 10 has a portion in relief 104 of section that is of substantially triangular with a flank facing towards the end wall 102 that is sloping.

Figure 3:
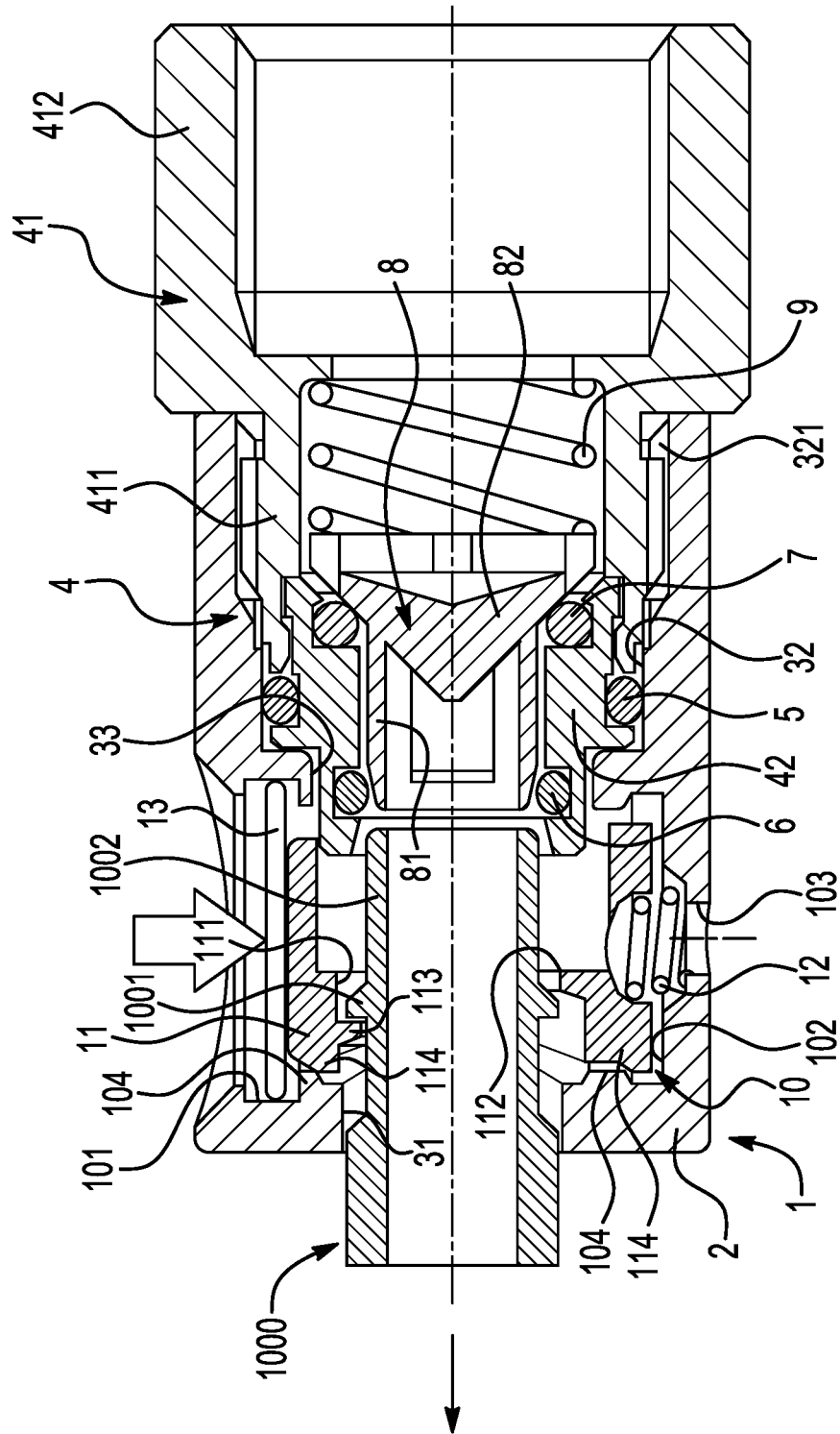
FIG. 3 shows a first disconnection step, and it is a view analogous to FIG. 1, in which the latch is in an unlocking transverse position and in a first axial position, and the endpiece is in an intermediate position.
Figure 4:
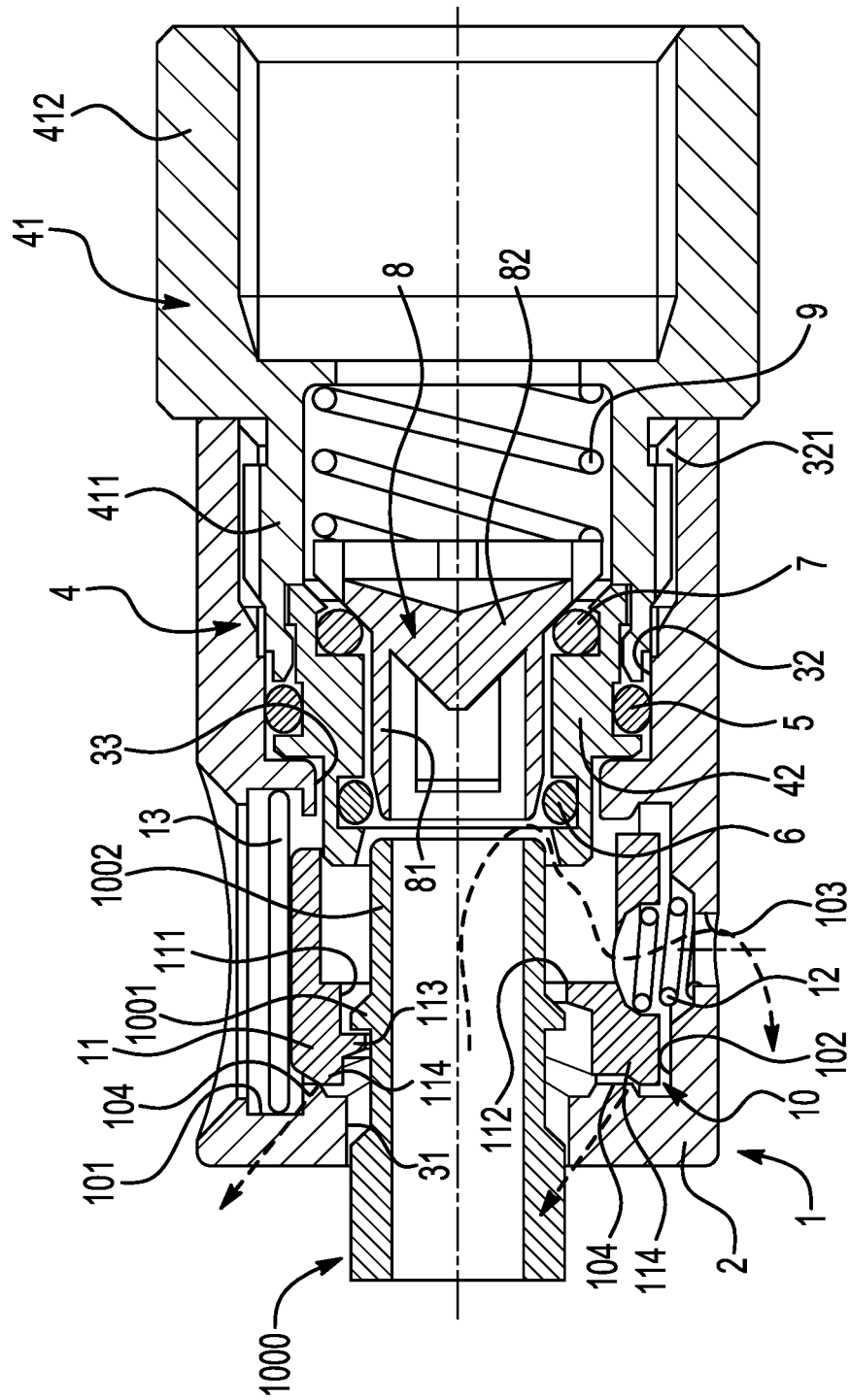
FIG. 4 shows a second disconnection step, and it is a view analogous to FIG. 1, in which the latch is in the unlocking transverse position and in the first axial position, and the endpiece is being purged.
Figure 5:
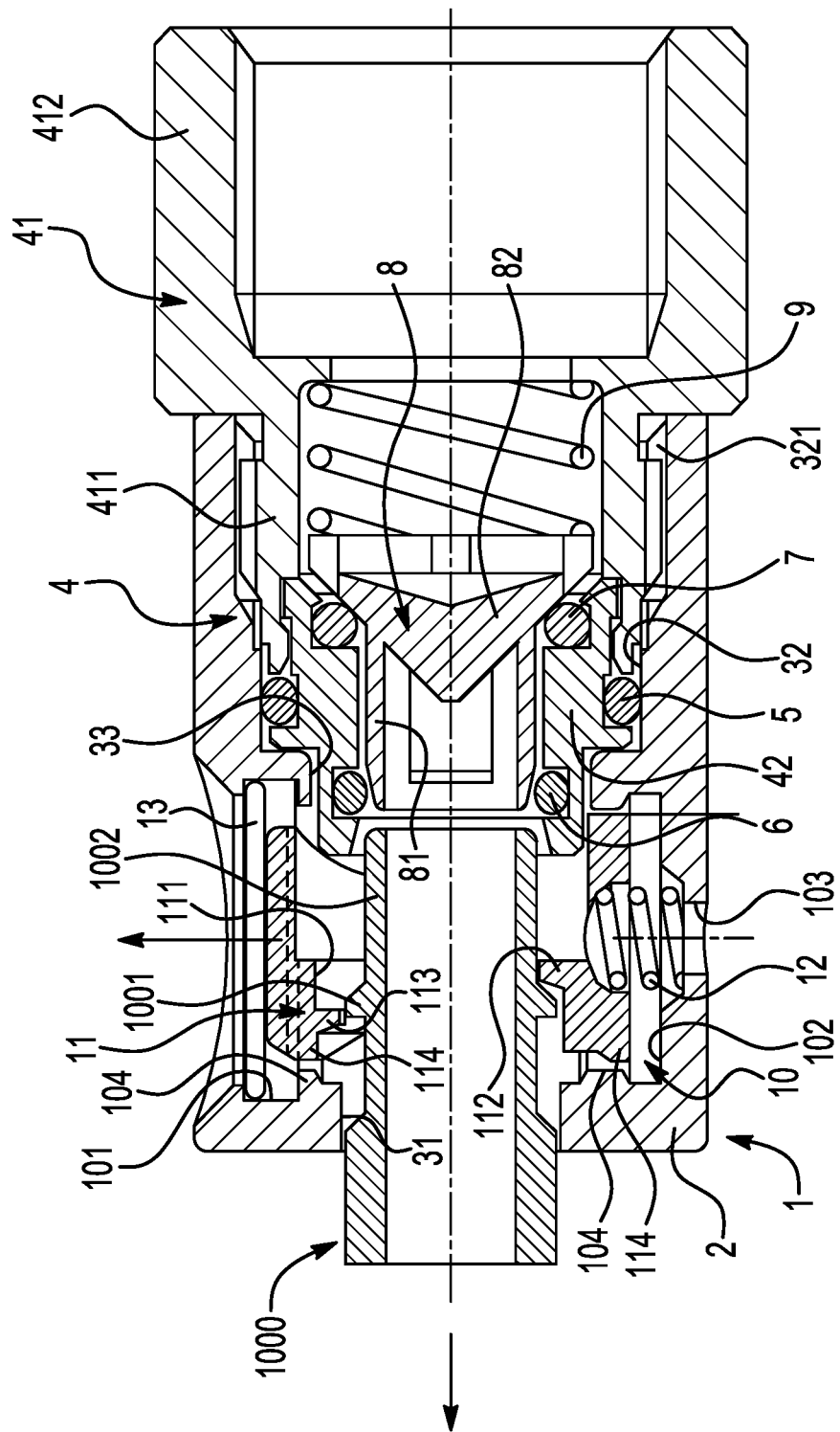
FIG. 5 shows a third disconnection step, and it is a view analogous to FIG. 1, in which the latch is in the locking transverse position and in the second axial position, while the endpiece is being extracted.

A latch 11 is mounted in the housing 10. The latch 11 is movable in the housing 10 transversely relative to the channel 3 between a locking position in which the latch 11 is close to the first end 101 (the position shown in FIGS. 1, 2, and 5), and an unlocking position in which the latch 11 is close to the end wall 102 (FIGS. 3 and 4). A helical spring 12 extends between the end wall 102 and the latch 11 in order to push the latch 11 back towards its locking position. The spring 12 bears against a setback formed around the purge orifice 103 in the end wall 102, the setback having a side wall that holds the end of the spring 12 that it receives in position coaxially inside the housing 10.

The latch 11 is provided with a transverse bore 111 of axis parallel to the axis of the first segment 31 so as to allow the end portion of the endpiece 1000 inserted in the first segment 31 to pass through the latch 11 in order to push the valve member 8 into its disengaged position. The transverse bore 111 is provided with first and second steps 112 and 113 projecting into the bore 111 at respective positions that are axially offset, in such a manner that:

when the latch 11 is in the locking position, the first step 112 holds the flange 1001 of the endpiece 1000 in a pushed-in position in which the nose 1002 passes through the first inner sealing gasket 6 so as to come to bear against the guide body 81 and hold the valve member 8 in the disengaged position (FIG. 1); and when the latch 11 is in the unlocking position, the second step 113 holds the flange 1001 of the endpiece 1000 in an intermediate position, in which the nose 1002 has moved out from the first inner sealing gasket 6 and leaves the valve member 8 in its closed position, so as to enable the endpiece 1000 to be purged (FIGS. 3 and 4).

It should be observed that the locking position is defined by the free end of the insert 42, which projects into the housing 10 and the bore 111 of the latch 11. The insert 42 thus performs two functions (guiding the valve member 8 and blocking the latch 11 in its housing 10). The unlocking position is defined by the end wall 102.

It can be understood that the first step 112 and the second step 113 are arranged on opposite sides of the bore 111: the first step 112 is beside the end wall 102, and the second step 113 is beside the first end 101. It can also be understood that the first step 112 is closer to the second segment 32 than is the second step 113.

The latch 11 presents two portions in relief 114 that are offset relative to each other along the axis of the housing 10 at a spacing equal to the spacing between the portions in relief 104. The portions in relief 114 are of section that is substantially triangular, each having a flank facing towards the first end 101 that is sloping.

The size of the latch 11, as measured parallel to the central axis of the first segment 31, is less than the size, as measured along the same axis, of the housing 10, such that the latch 11 is movable in the axial direction of the first segment 31 of the channel 3 between a first axial position in which the latch 11 and a wall of the housing 10 have two pairs of retaining portions in mutual contact for holding the latch in the unlocking position (FIGS. 3 and 4) and a second axial position in which said retaining portions of each pair of retaining portions are disengaged from each other and allow the latch 11 to rise towards its locking position (FIG. 5), the second axial position being closer to the valve member 8 than the first axial position. Each pair of retaining portions is constituted by one of the portions in relief 104 and by the adjacent portion in relief 114.

The helical spring 12 is also arranged to ensure that the latch 11 is urged towards its second axial position.

The slope of each of the portions in relief 104, 114 forms a cam tending to move the latch 11 from its first axial position towards its second axial position when the slopes of the portions in relief 104 and 114 are in contact, and when the latch 11 is moving from its unlocking position towards its locking position.

The first end 101 of the housing 10 receives an actuator button 13 for actuating the latch 11. In this example, the button 13 is in the simple shape of a disk, it is in contact with the end of the latch 11, and it is movable in translation along the axis of the housing 10. The button 13 may be pierced in order to facilitate purging the endpiece 1000.

Naturally, the invention is not limited to the embodiment described, but covers any variant coming within the ambit of the invention as defined by the claims.

In particular, the device may be of a structure that is different from that described.

The device could have only one pair of retaining portions.

Only one of retaining portions of one or of each pair of retaining portions need have a slope.

The retaining portions need not include a slope, with resilient return means, such as the spring 12, being used to urge the latch 11 into its second axial position.

The actuator button is optional. An operator could act directly on the latch.

The fluid that escapes while the endpiece is being purged may occupy spaces that result from assembly and manufacturing clearances, or it may travel along channels or orifices provided for this purpose in the body 2 and/or the latch 11.

The latch 11 may be held in its housing 10 by a dedicated pin replacing the free end of the insert 42.

The invention claimed is:

1. A coupling device comprising:
   a tubular body defining a channel;
   wherein the tubular body has successively along an axis:
      a first segment for receiving an endpiece; and
      a second segment in which a valve member is mounted to be axially movable under thrust from the endpiece from a closed position toward a disengaged position;
   wherein the closed position closes a seat that extends between the first segment and the second segment, towards the disengaged position;
   wherein the disengaged position includes disengaging the seat;
   wherein the first segment comprises a housing in which a latch is movably mounted to move transversely relative to the channel between an unlocking position and a locking position into which the latch is urged by a spring;
   wherein the latch comprises:
      a transverse bore enabling which enables the endpiece to pass through the latch to push against the valve member;
      a first step; and
      a second step;
   wherein the first step and the second step project into the transverse bore in axially offset positions in such a manner that, when the latch is in the locking position, the first step retains the endpiece in a pushed-in position holding the valve member in the disengaged position;
   wherein when the latch is in the unlocking position, the second step retains the endpiece in an intermediate position leaving the valve member in the closed position, thereby enabling the endpiece to be purge;
   wherein the latch is movable along the axial direction of the channel between a first axial position in which the latch and a wall of the housing have a first pair of retaining portions in mutual contact to retain the latch in the unlocking position, and a second axial position in which said retaining portions are disengaged from each other; and
   wherein the second axial position is closer to the valve member than the first axial position.

2. A The coupling device according to claim 1, wherein the housing for the latch is comprises an orifice opening to the outside of the body to enable the endpiece to be purged.

3. The coupling device according to claim 1, wherein the latch is urged towards the locking position by a helical spring extending between the latch and an end wall of the housing for the latch.

4. The coupling device according to claim 3, wherein the helical spring is arranged to ensure that the latch is urged towards the second axial position.

5. The coupling device according to claim 1,
   wherein the first pair of retaining portions includes a housing retaining portion;
   wherein the housing retaining portion is secured to the wall of the housing and has a slope forming a cam tending to move the latch away from the first axial position towards the second axial position when the first pair of retaining portions are in contact and when the latch is moving from the unlocking position to the locking position.

6. The coupling device according to claim 1,
   wherein the first pair of retaining portions includes a latch retaining portion which is secured to the latch;
   wherein the latch retaining portion has a slope forming a cam tending to move the latch away from the first axial position towards the second axial position when the first pair of retaining portions are in contact and when the latch is moving from the unlocking position to the locking position.

7. The coupling device according to claim 1, wherein the latch and the wall of the housing have a second pair of retaining portions that are mutually in contact when the latch is in the first axial position to retain the latch in the unlocking position, and that are disengaged from each other when the latch is in the second axial position, the channel passing between the first pair of retaining portions and the second pair of retaining portions.

8. The coupling device according to claim 1, wherein the housing has an end opening to the outside of the body and receiving a button for actuating the latch.

* * * * *